US009173072B2

(12) United States Patent
Berdichevsky et al.

(10) Patent No.: US 9,173,072 B2
(45) Date of Patent: Oct. 27, 2015

(54) METHODS AND SYSTEMS FOR VERIFICATION IN ACCOUNT REGISTRATION (75) Inventors: Micha Berdichevsky, San Francisco, CA (US); Bosmat Eldar, Menlo Park, CA (US); John Torres Fremlin, San Francisco, CA (US); Georgios Karnas, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 27 days.

(21) Appl. No.: 13/596,778

(22) Filed: Aug. 28, 2012

(65) Prior Publication Data
US 2014/0067930 A1 Mar. 6, 2014

(51) Int. Cl.
*G06F 15/16* (2006.01)
*H04W 4/06* (2009.01)

(52) U.S. Cl.
CPC ........................................ *H04W 4/06* (2013.01)

(58) Field of Classification Search
CPC . H04L 12/5895; H04L 2209/80; H04L 51/38; G06F 21/43; G06F 15/16; H04W 4/06
USPC .................... 709/204, 221; 707/999; 455/433
See application file for complete search history.

(56) References Cited

U.S. PATENT DOCUMENTS

| | | | |
|---|---|---|---|
| 8,099,490 B2* | 1/2012 | Deakin | 709/224 |
| 2009/0080631 A1* | 3/2009 | Liu et al. | 379/201.12 |
| 2009/0199176 A1* | 8/2009 | Nath et al. | 717/178 |
| 2009/0210148 A1* | 8/2009 | Jayanthi | 701/206 |
| 2009/0234845 A1* | 9/2009 | DeSantis et al. | 707/5 |
| 2009/0275331 A1* | 11/2009 | Maitreya et al. | 455/435.1 |
| 2009/0298491 A1* | 12/2009 | Kadaba | 455/419 |
| 2010/0087191 A1* | 4/2010 | Kocsis | 455/433 |
| 2010/0093284 A1* | 4/2010 | Terrero Diaz-Chiron et al. | 455/67.11 |
| 2010/0094978 A1* | 4/2010 | Runeson et al. | 709/221 |
| 2010/0144314 A1* | 6/2010 | Sherkin et al. | 455/411 |
| 2010/0161638 A1* | 6/2010 | Macrae | 707/759 |
| 2010/0312703 A1* | 12/2010 | Kulpati et al. | 705/44 |
| 2011/0131638 A1* | 6/2011 | Kan | 726/6 |
| 2011/0201329 A1* | 8/2011 | Carter | 455/432.1 |
| 2011/0275360 A1* | 11/2011 | Sample et al. | 455/422.1 |
| 2011/0296125 A1* | 12/2011 | Shaikh et al. | 711/159 |
| 2014/0220927 A1* | 8/2014 | Girard et al. | 455/405 |

* cited by examiner

*Primary Examiner* — Tesfay Yohannes
(74) *Attorney, Agent, or Firm* — Baker Botts L.L.P.

(57) ABSTRACT

Techniques to confirm account registration. In one embodiment, an MSISDN associated with a mobile device is received. It is determined whether to confirm registration of an account with a social networking system based at least in part on the MSISDN. Receipt of the MSISDN may include receipt of an HTTP request. The HTTP request may include an HTTP header with the MSISDN and a phone number associated with the mobile device. The MSISDN and the phone number may be compared. Registration may be confirmed based on a match between the MSISDN and the phone number.

24 Claims, 6 Drawing Sheets

352 → POST /register.php HTTP/1.1
Host: www.snswebsite.com
User-Agent: Android/2.2
Content-Type: application/x-www-form-urlencoded
Content-Length: 102
356 → X-MSISDN: 0116505551234

354

358 { First+Name=John&Last+Name=Doe&Phone=6505551234&Gender+Male
&Birthdate=January+1+1987&Choose+Password=guessme

METHODS AND SYSTEMS FOR VERIFICATION IN ACCOUNT REGISTRATION

FIELD OF THE INVENTION

The present application relates to account registration and, in particular, confirmation of account registration in a social networking system.

BACKGROUND

Social networking websites provide a dynamic environment in which members can connect to and communicate with other members. These websites may commonly provide online mechanisms allowing members to interact within their preexisting social networks, as well as create new social networks. Members may include any individual or entity, such as an organization or business. Among other attributes, social networking websites allow members to effectively and efficiently communicate relevant information to their social networks.

A member of a social network may highlight or share personal information, news stories, relationship activities, music, and any other content of interest to areas of the website dedicated to the member. Other members of the social network may access the shared content by browsing member profiles or performing dedicated searches. Upon access to and consideration of the content, the other members may react by taking one or more responsive actions, such as providing an opinion about the content, or other feedback. The ability of members to interact in this manner fosters communications among them and helps to realize the goals of social networking websites.

Tools for accessing social networking websites from a variety of technology platforms have grown along with the tools for accessing the Internet in general. Initially, many users accessed the Internet exclusively from desktop computers. User interfaces of social networking websites accordingly were designed for desktop web browsers. However, the growing popularity of mobile computing has facilitated Internet access from a variety of different devices and platforms. Likewise, more users seek to participate in social networking websites within a mobile computing paradigm.

SUMMARY

To determine whether to confirm account registrations with a social networking system, embodiments of the invention include systems, methods, and computer readable media to receive an MSISDN associated with a mobile device. It is determined whether to confirm registration of an account with a social networking system based at least in part on the MSISDN.

In an embodiment, receiving the MSISDN includes receiving an HTTP request. The HTTP request may include an HTTP header with the MSISDN.

In an embodiment, a phone number associated with the mobile device may be received. An HTTP request may include the MSISDN and the phone number.

In an embodiment, the MSISDN and the phone number may be compared.

In an embodiment, registration may be confirmed based on a match between the MSISDN and the phone number. A user associated with the registration may be notified about the confirmed registration. The registration may be confirmed without providing a dedicated message about the registration from the social networking system.

In an embodiment, registration may be refused based on absence of a match between the MSISDN and the phone number. A user associated with the registration may be notified about the refused registration. The registration may be refused without providing a dedicated message about the registration from the social networking system.

In an embodiment, account registration information including a phone number associated with the mobile device may be received. The account registration information may be requested in a registration form provided to a user.

In an embodiment, the MSISDN may be provided by a wireless carrier server. The wireless carrier server may provide a signature. An IP address associated with a request including the MSISDN and an IP address of the wireless carrier server may be compared.

In an embodiment, the MSISDN may be provided from a wireless communication service provider to the social networking system based on agreement between the wireless communication service provider and the social networking system.

Many other features and embodiments of the invention will be apparent from the accompanying drawings and from the following detailed description.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Social Networking System—General Introduction

Figure 1:
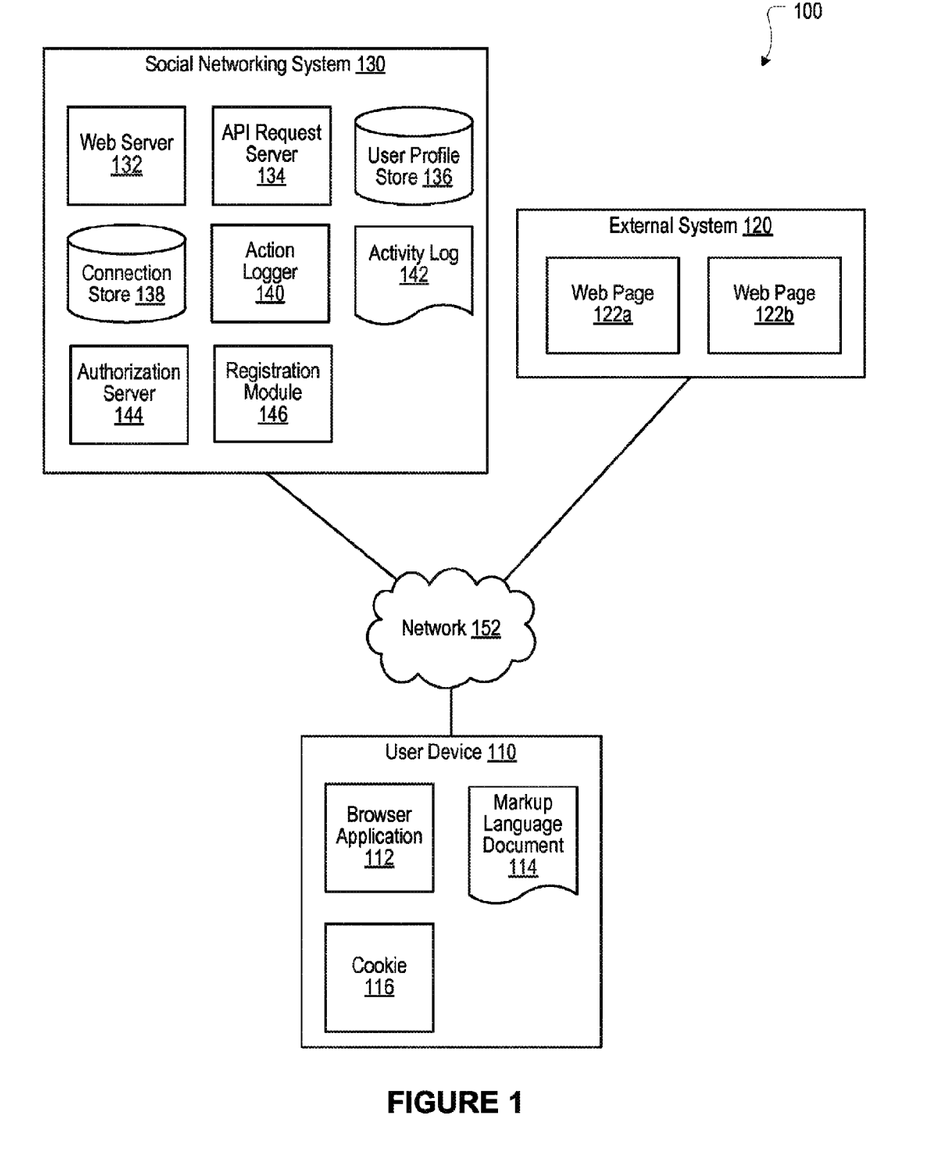
FIG. 1 is a network diagram of a system for confirmation of account registration within a social networking system in accordance with an embodiment of the invention.

FIG. 1 is a network diagram of a system 100 for detecting fake accounts in a social networking system 130 in accordance with an embodiment of the invention. The system 100 includes one or more user devices 110, one or more external systems 120, the social networking system 130, and a network 152. For purposes of illustration, the embodiment of the system 100, shown by FIG. 1, includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform or backbone, which other systems, such as external systems 120, may use to provide social networking services and functionalities to users across the Internet.

The user device 110 comprises one or more computing devices that can receive input from a user and transmit and receive data via the network 152. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 152. The user device 110 can execute an application, for example, a browser application that allows a user of the user device 110 to interact with the social networking system 130. In another embodiment, the user device 110 interacts with the social networking system 130 through an application programming interface (API) provided by the native operating system of the user device 110, such as iOS and ANDROID. The user device 110 is configured to communicate with the external system 120 and the social networking system 130 via the network 152, which may comprise any combination of local area and/or wide area networks, using wired and/or wireless communication systems.

In one embodiment, the network 152 uses standard communications technologies and protocols. Thus, the network 152 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 152 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 152 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, the markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode the markup language document 114.

The markup language document 114 may also include, or link to, applications or application frameworks such as FLASH™ or Unity™ applications, the SilverLight™ application framework, etc.

In one embodiment, the user device 110 also includes one or more cookies 116 including data indicating whether a user of the user device 110 is logged into the social networking system 130, which may enable customization of the data communicated from the social networking system 130 to the user device 110.

The external system 120 includes one or more web servers that include one or more web pages 122a, 122b, which are communicated to the user device 110 using the network 152. The external system 120 is separate from the social networking system 130. For example, the external system 120 is associated with a first domain, while the social networking system 130 is associated with a separate social networking domain. Web pages 122a, 122b, included in the external system 120, comprise markup language documents 114 identifying content and including instructions specifying formatting or presentation of the identified content.

The social networking system 130 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure.

Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130. For example, in an embodiment, if users in the social networking system 130 are represented as nodes in the social graph, the term "friend" can refer to an edge formed between and directly connecting two user nodes.

Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of the social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (i.e., social networks of people, entities, and concepts) to which users of the social networking system 130 may belong, events or calendar entries in which a user might be interested, computer-based applications that a user may use via the social networking system 130, transactions that allow users to buy or sell items via services provided by or through the social networking system 130, and interactions with advertisements that a user may perform on or off the social networking system 130. These are just a few examples of the items upon which a user may act on the social networking system 130, and many others are possible. A user may interact with anything that is capable of being represented in the social networking system 130 or in the external system 120, separate from the social networking system 130, or coupled to the social networking system 130 via the network 152.

The social networking system 130 is also capable of linking a variety of entities. For example, the social networking system 130 enables users to interact with each other as well as external systems 120 or other entities through an API, a web service, or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 140, an activity log 142, an authorization server 144, and a registration module 146. In an embodiment of the invention, the social networking system 130 may include additional, fewer, or different components for various applications. Other components including, but not limited to, network interfaces, security mechanisms, load balancers, failover servers, management and network operations consoles, and the like are not shown so as to not obscure the details of the system.

The user profile store 136 maintains information about user accounts, including biographic, demographic, and other types of descriptive information, such as work experience, educational history, hobbies or preferences, location, and the like that has been declared by users or inferred by the social networking system 130. This information is stored in the user profile store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user profile store 136 and the connection store 138 store instances of the corresponding type of objects maintained by the social networking system 130. Each object type has information fields that are suitable for storing information appropriate to the type of object. For example, the user profile store 136 contains data structures with fields suitable for describing a user's account and information related to a user's account. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user profile store 136, assigns a unique identifier to the user account, and begins to populate the fields of the user account with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user profile store 136 and the connection store 138 may be implemented as a federated database.

Data stored in the connection store 138, the user profile store 136, and the activity log 142 enables the social networking system 130 to generate the social graph that uses nodes to identify various objects and edges connecting nodes to identify relationships between different objects. For example, if a first user establishes a connection with a second user in the social networking system 130, user accounts of the first user and the second user from the user profile store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user profile store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 152. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to call access information from the social networking system 130 by calling one or more API functions. The API request server 134 may also allow external systems 120 to send information to the social networking system 130 by calling APIs. The external system 120, in one embodiment, sends an API request to the social networking system 130 via the network 152, and the API request server 134 receives the API request. The API request server 134 processes the request by calling an API associated with the API request to generate an appropriate response, which the API request server 134 communicates to the external system 120 via the network 152. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 140 is capable of receiving communications from the web server 132 about user actions on and/or off the social networking system 130. The action logger 140 populates the activity log 142 with information about user actions, enabling the social networking system 130 to discover various actions taken by its users within the social networking system 130 and outside of the social networking system 130. Any action that a particular user takes with respect to another node on the social networking system 130 may be associated with each user's account, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 140 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information, but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 144 contains logic to determine if certain information associated with a user can be accessed by a user's friends, external systems 120, and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

The registration module 146 manages the registration of accounts with the social networking system 130. The registration module 146 controls the registration of users who may access the social networking system 130 from mobile computing systems, such as the user device 110. As described in more detail below, the registration module 146 verifies account registration information and confirms registration of an account with the social networking system 130.

Verification of Phone Number in Account Registration

Account registration with the social networking website may involve a user visiting a webpage, such as a home page, of the social networking website. The webpage may include a button, such as a "Sign Up" button, that links to a registration form. When downloaded, the registration form may prompt the user to provide various information, such as the name of the user, a valid email address of the user, a password, the gender of the user, the birthday of the user, and perhaps other identifying or demographic information. Once the registration information is entered and submitted, the social networking website may send a message to the email address provided in the registration form. The message may include a link as well as an instruction for the user to click the link. The social networking website may require the user to click the link to confirm the account registration. Upon such confirmation, the account will be active and available for use.

A mobile device capable of accessing the social networking website may be used to register an account with the social networking website. For the mobile device, the social networking website can provide a registration form that may prompt the user for a phone number associated with the mobile device. To confirm the account registration, the social networking website may cause a message, such as an SMS text, to be addressed to the phone number provided in the registration form. The message may include a code to be typed by the user and returned to the social networking website. In some instances, the social networking website may direct a wireless communication service provider to which the user may be subscribed to deliver the message to the mobile device. In other instances, the social networking website may request another type of entity, such as an aggregator company, to cause the message to be provided by the user. In either instance, message delivery can be unreliable due to variety of factors. When the message is not delivered to the mobile device, the user cannot provide the confirmation necessary to complete the process for account registration.

Figure 2:
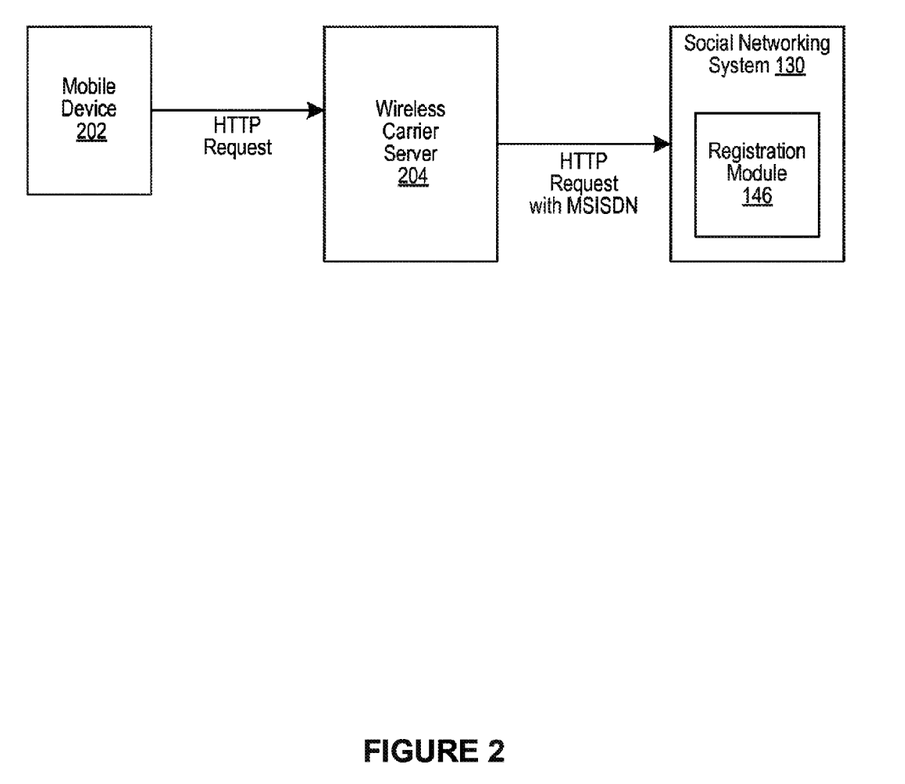
FIG. 2 illustrates a system for account registration in accordance with an embodiment of the invention.

FIG. 2 illustrates a system for account registration with the social networking system 130 in accordance with an embodiment of the invention. During the process of account registration, a mobile device 202 of a user may be in communication with the social networking system 130 through a wireless carrier server 204 of a wireless communication service provider. The mobile device 202 may be any mobile computing system, including but not limited to a smart phone, a tablet computer, a laptop computer, and the like. The wireless carrier server 204 may be a computer system, including one or more servers, controlled by a wireless communication service provider with which the user is subscribed for the provision of data services for the mobile device 202. In an embodiment, the mobile device 202 may be the user device 110. The mobile device 202, the wireless carrier server 204, and the social networking system 130 may communicate over the network 152. In an embodiment, communications between the mobile device 202 and the wireless carrier server 204, and between the wireless carrier server 204 and the social networking system 130, may be conducted over the Internet using a protocol, such as Hypertext Transfer Protocol (HTTP). In an embodiment, such communications also may be conducted using Hypertext Transfer Protocol Secure (HTTPS).

Figure 3A:
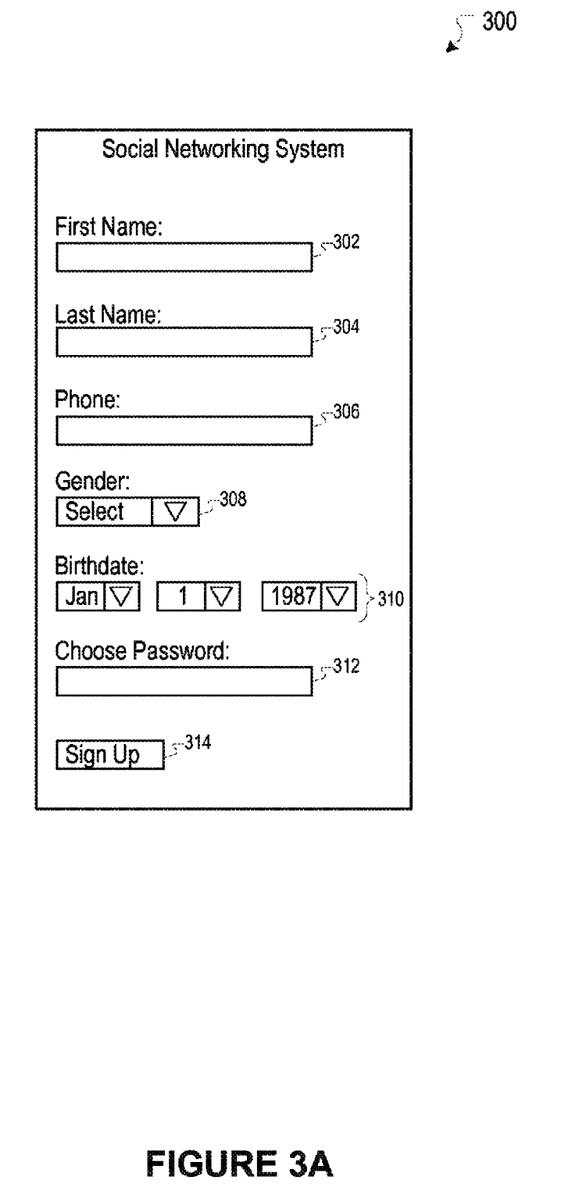
FIG. 3A illustrates an example registration form in accordance with an embodiment of the invention.

For account registration by the user, the social networking system 130 may provide a registration form to the mobile device 202. FIG. 3A illustrates an example registration form 300 in accordance with an embodiment of the invention. In an embodiment, the registration form 300 may be presented as part of a web page of the social networking system 130 for display on the mobile device 202. The registration form 300 may include a field 302 and a field 304 for the user to enter her first name and last name, respectively; a field 306 for the user to enter the phone number of the mobile device 202; a select list 308 and select lists 310 for the user to select her gender and birth date, respectively; and, a field 312 for the user to enter a password. In an embodiment, a registration form for account registration with the social networking system 130 may prompt the user to provide types of information other than as shown in the registration form 300. The registration form 300 also may include a sign up button 314. Upon selection of the sign up button 314, the account registration information provided by the user may be transmitted from the mobile device 202.

The account registration information may be provided to the social networking system 130 through the wireless carrier server 204. The account registration information may be communicated as an HTTP request from the mobile device 202 to the wireless carrier server 204. Upon receipt of the account registration information, the wireless carrier server 204 may relay the account registration information to the social networking system 130. In an embodiment, the account registration information may be communicated as an HTTP request from the wireless carrier server 204 to the social networking system 130.

The wireless carrier server 204 may include in the HTTP request a header having the Mobile Subscriber Integrated Services Digital Network Number (MSISDN) associated with the mobile device 202. The MSISDN is a number uniquely identifying a subscription in a wireless communication network, such as GSM or UMTS. The MSISDN may be comprised of different constituent parts, including a country code (CC), a national destination code (NDC) or number planning area (NPA), and a subscriber number (SN). In an embodiment, the appearance of MSISDNs in headers of HTTP requests may result from agreement between the wireless communication service provider in control of the wireless carrier server 204 and the operator of the social networking system 130 to include such information.

Figure 3B:
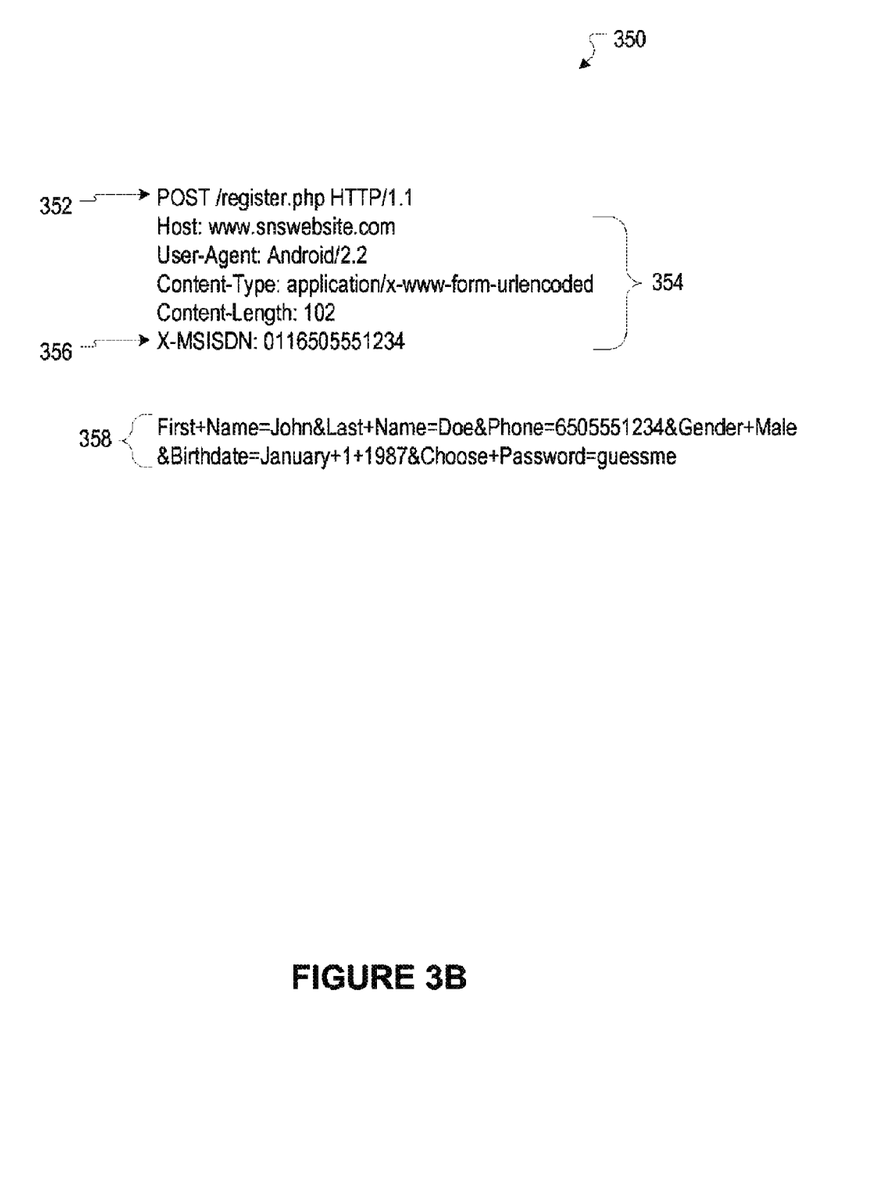
FIG. 3B illustrates an example HTTP request in accordance with an embodiment of the invention.

FIG. 3B illustrates an example HTTP request 350 in accordance with an embodiment of the invention. The HTTP request may be provided from the wireless carrier server 204 to the social networking system 130. As illustrated, the HTTP request may include a request line 352 and header lines 354. The header lines may include various headers, such as Host, User-Agent, Content-Type, and Content-Length. More or fewer headers may be included in the HTTP request. A header line 356 includes a header "X-MSISDN" to include the MSISDN of the mobile device 202. For example, header information containing the MSISDN for the mobile device 202 may be set forth as "X-MSISDN: 0116505551234". The MSISDN may be provided by the wireless carrier server 204 or the wireless communication service provider. A message body 358 includes account registration information provided by a user on a registration form, such as the registration form 300. The message body 358 may include the phone number of the mobile device 202 as provided by the user.

As shown in FIG. 2, the social networking system 130 may receive the HTTP request relayed by the wireless carrier server 204 and use the MSISDN in the account registration process. The registration module 146 of the social networking system 130 may compare the MSISDN of the mobile device 202 with the phone number provided by the user in the registration form 300. In an embodiment, when the phone number provided by the user and the MSISDN provided by the wireless carrier server 204 match, the social networking system 130 may determine that account registration information is correct and that the attempt to register the account is proper. Thus, when the phone number and the MSISDN match, the registration module 146 may confirm account registration. In an embodiment, the registration module 146 or the social networking system 130 may cause a notice to be provided to the user that the attempt to register an account was successful.

In an embodiment, when the phone number provided by the user and the MSISDN provided by the wireless carrier server 204 do not match, the social networking system 130 may determine that account registration information is not correct or that the attempt to register the account is not proper. Thus, in the absence of a match between the phone number and the MSISDN, the registration module 146 may refuse account registration. The social networking system 130 accordingly may take appropriate remedial action. For example, appropriate remedial action may include blocking registration of the account. As another example, appropriate remedial action may include one or more of the following responses by the social networking system 130: notifying the user that the phone number and the MSISDN do not match; requesting the user to retry the registration with correct information; and, associating the account registration information and the MSISDN with a spammer entity.

The determination of a possible match between the phone number provided by the user and the MSISDN provided by the wireless carrier server 204 may be determined in various manners. For example, a match may be determined when the phone number is identical to the MSISDN without consideration of a portion of the MSISDN, such as a country code. As another example, a match may be determined when some, all, or a threshold number of digits in the phone number and the MSISDN are identical.

Receipt by the social networking system 130 of the phone number of a mobile device provided by a user and the MSISDN provided by a wireless mobile carrier allows for streamlined confirmation, or refusal, of an account registration. Such confirmation or refusal may be performed without the conventional need for separate provision, by the social networking system 130 or another entity, of a dedicated message to the mobile device to prompt additional action by the user to verify account registration information. In this manner, a convention step in the process for account registration may be eliminated.

In an embodiment, additional security measures may be taken to verify that the HTTP request, in fact, came from the wireless carrier server 204 and that the MSISDN therein is correct. For example, the wireless carrier server 204 may provide a signature for the headers in the HTTP request. As another example, the social networking system 130 may compare the IP address of the source of the HTTP request with known IP addresses of wireless carrier servers to confirm that the request was provided by an appropriate entity. Other security measures may be suitable as well.

Figure 4:
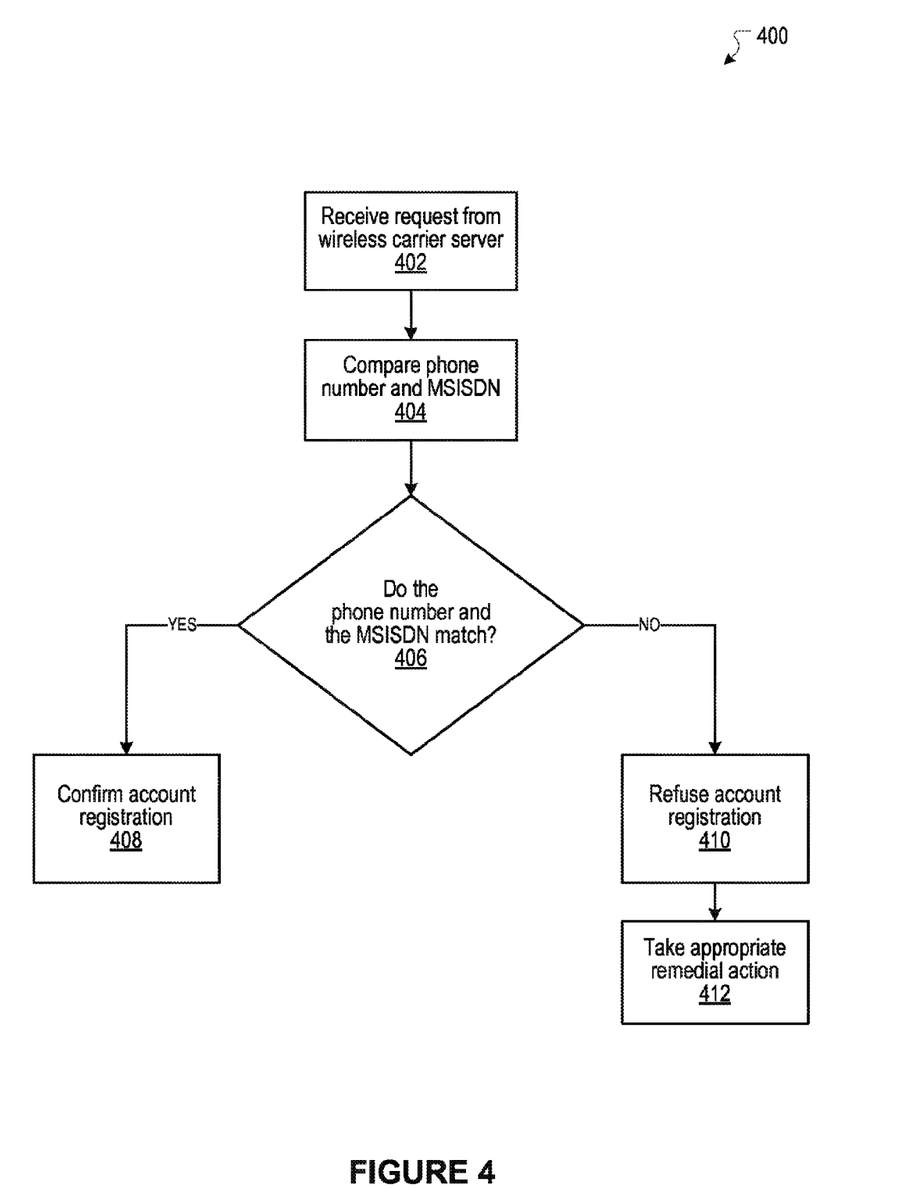
FIG. 4 is a process for confirming account registration in accordance with an embodiment of the invention.

FIG. 4 illustrates a process 400 to confirm account registration in accordance with an embodiment of the invention. At block 402, a request from a wireless carrier server 204 is received. The request may be an HTTP request from the mobile device 202 to register the user with the social networking system 130. The HTTP request may include account registration information provided by a user, including a phone number associated with the mobile device 202. The HTTP request may also include an MSISDN of the mobile device 202 provided by the wireless carrier server 204. In an embodiment, the MSISDN may be provided as an HTTP header. In block 404, the phone number provided by the user and the MSISDN provided by the wireless carrier server 204 are compared. In block 406, it is determined whether the phone number and the MSISDN match. If the result of block 406 is yes, at block 408, the attempt to register the account by the user is determined to be proper and the account registration is confirmed. Confirmation of account registration causes the account to be activated and ready for use. If the result of block 406 is no, at block 410, account registration is refused. At block 412, appropriate remedial action is taken based on non-confirmation of the account registration. Appropriate remedial action may include refusal to register the account or other suitable measures. In an embodiment, a notification may be provided to the user regarding whether the attempt to register an account was successful or not. In an embodiment, the process 400 may be performed in whole or in part by the social networking system 130 or the registration module 146.

Conclusion

Figure 5:
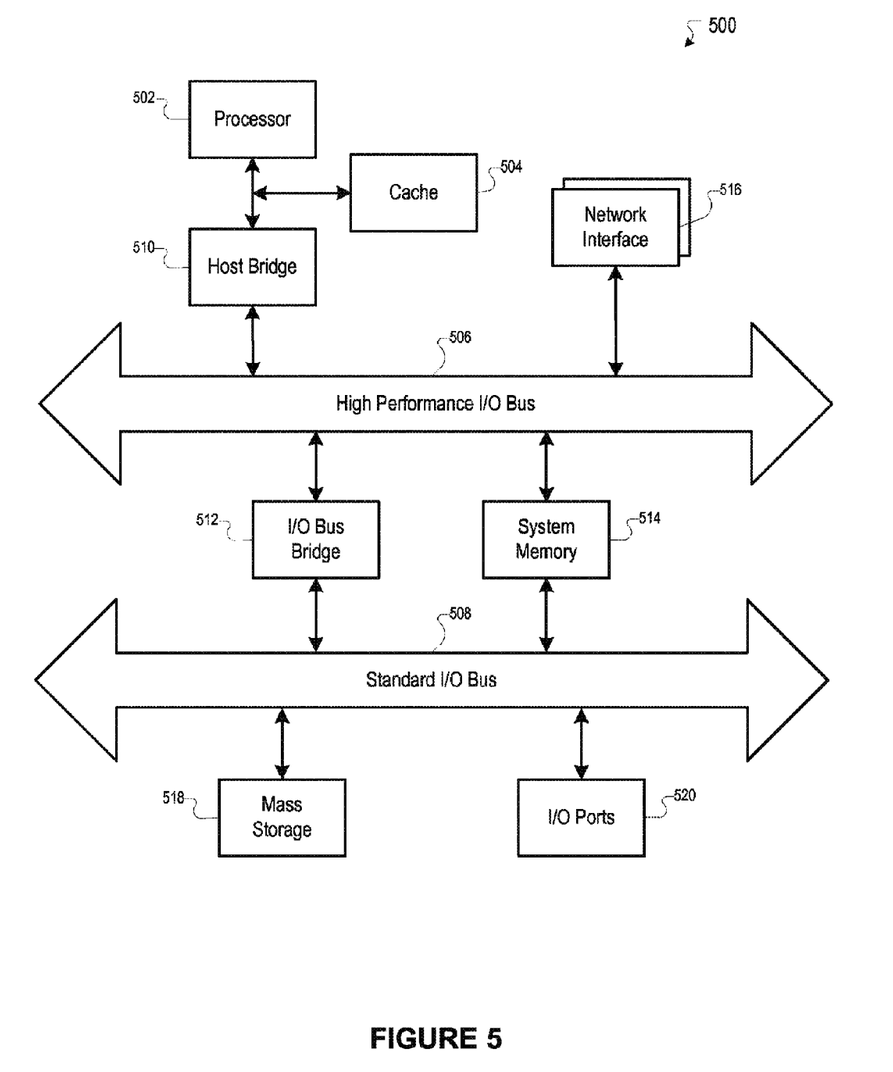
FIG. 5 shows a diagram of a computer system in accordance with an embodiment of the invention.

The foregoing processes and features can be implemented by a wide variety of machine and computer system architectures and in a wide variety of network and computing environments. FIG. 5 illustrates an example of a computer system 500 that may be used to implement one or more of the computing devices identified above. The computer system 500 includes sets of instructions for causing the computer system 500 to perform the processes and features discussed herein. The computer system 500 may be connected (e.g., networked) to other machines. In a networked deployment, the computer system 500 may operate in the capacity of a server machine or a client machine in a client-server network environment, or as a peer machine in a peer-to-peer (or distributed) network environment. In an embodiment of the invention, the computer system 500 may be the social networking system 130, the user device 110, the external system 120, or a component thereof. In an embodiment of the invention, the computer system 500 may be one server among many that constitutes all or part of the social networking system 130.

The computer system 500 includes a processor 502, a cache memory 504, and one or more executable modules and drivers, stored on a computer-readable medium, directed to the processes and features described herein. Additionally, the computer system 500 includes a high performance input/output (I/O) bus 506 and a standard I/O bus 508. A host bridge 510 couples the processor 502 to the high performance I/O bus 506, whereas I/O bus bridge 512 couples the two buses 506 and 508 to each other. A system memory 514 and one or more network interfaces 516 couple to the bus 506. The computer system 500 may further include video memory and a display device coupled to the video memory (not shown). Mass storage 518 and I/O ports 520 couple to the bus 508. The computer system 500 may optionally include a keyboard and pointing device, a display device, or other input/output devices (not shown) coupled to the bus 508. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 500, including the input and output of data to and from software applications (not shown). The operating system provides an interface between the software applications being executed on the system and the hardware components of the system. Any suitable operating system may be used, such as the LINUX Operating System; the Apple Macintosh Operating System, available from Apple Computer Inc. of Cupertino, Calif.; UNIX operating systems; Microsoft® Windows® operating systems; BSD operating systems; and the like. Other implementations are possible.

The elements of the computer system 500 are described in greater detail below. In particular, the network interface 516 provides communication between the computer system 500 and any of a wide range of networks, such as an Ethernet (e.g., IEEE 802.3) network, a backplane, etc. The mass storage 518 provides permanent storage for the data and programming instructions to perform the above-described processes and features implemented by the respective computing systems identified above, whereas the system memory 514 (e.g., DRAM) provides temporary storage for the data and programming instructions when executed by the processor 502. The I/O ports 520 may be one or more serial and/or parallel communication ports that provide communication between additional peripheral devices, which may be coupled to the computer system 500.

The computer system 500 may include a variety of system architectures, and various components of the computer system 500 may be rearranged. For example, the cache 504 may be on-chip with processor 502. Alternatively, the cache 504 and the processor 502 may be packed together as a "processor module", with processor 502 being referred to as the "processor core". Furthermore, certain embodiments of the invention may neither require nor include all of the above components. For example, peripheral devices coupled to the standard I/O bus 508 may couple to the high performance I/O bus 506. In addition, in some embodiments, only a single bus may exist, with the components of the computer system 500 being coupled to the single bus. Furthermore, the computer system 500 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 500 which, when read and executed by one or more processors, cause the computer system 500 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 500, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 502. Initially, the series of instructions may be stored on a storage device, such as the mass storage 518. However, the series of instructions can be stored on any suitable computer readable storage medium. Furthermore, the series of instructions need not be stored locally, and could be received from a remote storage device, such as a server on a network, via the network interface 516. The instructions are copied from the storage device, such as the mass storage 518, into the system memory 514, and then accessed and executed by processor 502.

Examples of computer readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 500 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", or the like means that a particular feature, design, structure, or characteristic described in connection with the embodiment is included in at least one embodiment of the disclosure. The appearances of, for example, the phrase "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, by a computer system, a request for registering a user, a header portion of the request comprising a signature provided by a wireless carrier and a Mobile Subscriber Integrated Services Digital Network Number (MSISDN) associated with a mobile device, the MSISDN being provided by the wireless carrier, and a body portion of the request comprising registration information provided by the user, the registration information comprising a phone number;
determining, by the computer system, whether the MSISDN associated with the mobile device matches the phone number in the registration information; and
if the MSISDN associated with the mobile device matches the phone number in the registration information,
confirming, by the computer system, registration of an account for the user with a social networking system;
else,
refusing, by the computer system, registration of the account for the user with the social networking system and notifying the user about the refused registration.

2. The method of claim 1, wherein the request is an HTTP request.

3. The method of claim 1, wherein the MSISDN matches the phone number, further comprising notifying a user associated with the registration about the confirmed registration.

4. The method of claim 1, wherein the confirming the registration is performed without providing a dedicated message about the registration from the social networking system.

5. The method of claim 1, wherein the refusing the registration is performed without providing a dedicated message about the registration from the social networking system.

6. The method of claim 1, wherein the account registration information is requested in a registration form provided to the user.

7. The method of claim 1, further comprising comparing an IP address associated with the request to an IP address of a server of the wireless carrier.

8. The method of claim 1, wherein the MSISDN is provided from the wireless carrier to the social networking system based on agreement between the wireless carrier and the social networking system.

9. A non-transitory, computer-readable storage media comprising instructions operable, when executed by one or more computing systems to:
receive a request for registering a user, a header portion of the request comprising a signature provided by a wireless carrier server and a MSISDN associated with a mobile device, the MSISDN being provided by the wireless carrier server, and a body portion of the request comprising registration information provided by the user, the registration information comprising a phone number;
determine whether the MSISDN associated with the mobile device matches the phone number in the registration information; and
if the MSISDN associated with the mobile device matches the phone number in the registration information,
confirm registration of an account for the user with a social networking system;
else,
refuse registration of the account for the user with the social networking system and notifying the user about the refused registration.

10. A system comprising:
one or more processors; and
a memory coupled to the processors comprising instructions executable by the processors, the processors operable when executing the instructions to:
receive a request for registering a user, a header portion of the request comprising a signature provided by a wireless carrier and a MSISDN associated with a mobile device, the MSISDN being provided by the wireless carrier, and a body portion of the request comprising registration information provided by the user, the registration information comprising a phone number;
determine whether the MSISDN associated with the mobile device matches the phone number in the registration information; and
if the MSISDN associated with the mobile device matches the phone number in the registration information,
confirm registration of an account for the user with a social networking system;
else,
refuse registration of the account for the user with the social networking system and notifying the user about the refused registration.

11. The media of claim 9, wherein the request is an HTTP request.

12. The media of claim 9, wherein the MSISDN matches the phone number, further comprising notifying a user associated with the registration about the confirmed registration.

13. The media of claim 9, wherein the confirming the registration is performed without providing a dedicated message about the registration from the social networking system.

14. The media of claim 9, wherein the refusing the registration is performed without providing a dedicated message about the registration from the social networking system.

15. The media of claim 9, wherein the account registration information is requested in a registration form provided to the user.

16. The media of claim 9, further comprising comparing an IP address associated with the request to an IP address of a server of the wireless carrier.

17. The media of claim 9, wherein the MSISDN is provided from the wireless carrier to the social networking system based on agreement between the wireless carrier and the social networking system.

18. The system of claim 10, wherein the request is an HTTP request.

19. The system of claim 10, wherein the MSISDN matches the phone number, further comprising notifying a user associated with the registration about the confirmed registration.

20. The system of claim 10, wherein the confirming the registration is performed without providing a dedicated message about the registration from the social networking system.

21. The system of claim 10, wherein the refusing the registration is performed without providing a dedicated message about the registration from the social networking system.

22. The system of claim 10, wherein the account registration information is requested in a registration form provided to the user.

23. The system of claim 10, further comprising comparing an IP address associated with the request to an IP address of a server of the wireless carrier.

24. The system of claim 10, wherein the MSISDN is provided from the wireless carrier to the social networking system based on agreement between the wireless carrier and the social networking system.

\* \* \* \* \*